United States Patent [19]

Habrich et al.

[11] Patent Number: 4,970,399
[45] Date of Patent: Nov. 13, 1990

[54] METHOD AND APPARATUS FOR PROCESSING UV-HARDENABLE REACTION RESIN COMPOUNDS

[75] Inventors: Reiner Habrich, Kircheim; Heiner Bayer, Olching, both of Fed. Rep. of Germany

[73] Assignee: Siemens Aktiengesellschaft, Berlin & Munich, Fed. Rep. of Germany

[21] Appl. No.: 392,362

[22] Filed: Aug. 10, 1989

Related U.S. Application Data

[62] Division of Ser. No. 151,431, Feb. 2, 1988, Pat. No. 4,880,662.

[30] Foreign Application Priority Data

Feb. 2, 1987 [DE] Fed. Rep. of Germany ....... 3702999

[51] Int. Cl.$^5$ ............................................. G01N 21/01
[52] U.S. Cl. .................................. 250/435; 250/504 R; 118/627; 118/600; 422/186
[58] Field of Search ................... 250/435, 436, 432 R, 250/504 R; 118/627, 600; 422/186

[56] References Cited

U.S. PATENT DOCUMENTS

| | | | |
|---|---|---|---|
| 4,189,363 | 2/1980 | Beitzel | 422/186 |
| 4,274,970 | 6/1981 | Beitzel | 422/186 |
| 4,437,954 | 3/1984 | Sammells et al. | 422/186 |
| 4,710,638 | 12/1987 | Wood | 250/504 R |
| 4,770,898 | 9/1988 | Sugai et al. | 427/54.1 |
| 4,831,268 | 5/1989 | Fisch et al. | 250/435 |

Primary Examiner—Bruce C. Anderson
Attorney, Agent, or Firm—Kenyon & Kenyon

[57] ABSTRACT

UV-hardenable reaction resin compounds are irradiated in an applicator and immediately fed to an object that is to be covered. An initial, not activated reaction resin compound is irradiated after entering an input opening in a reactor having an irradiation space, a UV-radiation source and, optionally, a reflector. Immediately thereafter the activated compound is fed to an object to be coated or to an object to be surrounded, in an open casting mold or to a closed casting mold via the exit opening, optionally via a casting canal. The method and the apparatus are particularly well suited for covering semiconductor components and for encapsulating active and passive components as well as for cementing UV-impermeable fitting parts.

6 Claims, 3 Drawing Sheets

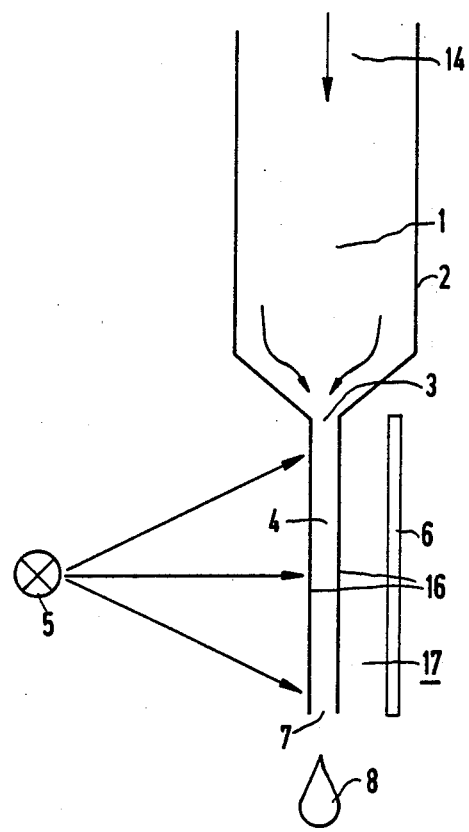
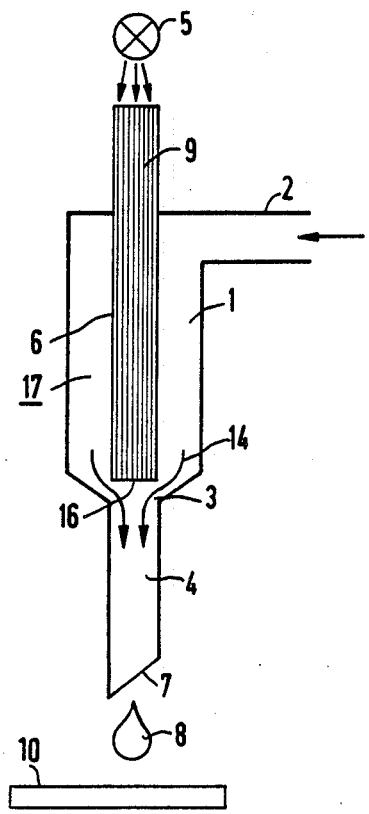
FIG 1
FIG 2

METHOD AND APPARATUS FOR PROCESSING UV-HARDENABLE REACTION RESIN COMPOUNDS

This is a division of application Ser. No. 151,431, filed Feb. 2, 1988, now U.S. Pat. No. 4,880,662.

BACKGROUND OF THE INVENTION

1. Field of the Invention.

The present invention relates to a method and apparatus for processing reaction resin that is harden with ultra-violet (UV) light.

2. Description of Related Art.

Radiation hardenable reaction resins are frequently preferred over thermally hardenable reaction resins because the former harden substantially faster at low temperatures and have a nearly unlimited use life.

Radiation hardenable reaction resins are commonly irradiated after applying the reaction resin as disclosed, for example, in European Patent Application No. 0 094 915 A3. For example, UV hardening varnishes are irradiated over the whole surface after the varnishing process. Compounds to cover the electronic circuitry are likewise irradiated over the whole surface after the covering operation or exposed by scanning with focused radiation sources often comprising short flashes.

More recent attempts to cover small electronic components, such as LEDs, with UV-hardening compounds assume that the exposure process occurs after the casting. The hardening effectively occurs in the mold and optionally through the latter. The same process is also used for encapsulating passive components such as foil capacitors.

The foregoing applications have the disadvantage that the irradiation must be performed on the "finished" object, i.e., the place of the irradiation is fixed by the device to be coated or encapsulated.

The irradiation is typically performed with shortwave electromagnetic radiation or electron radiation, i.e., with radiation which is easy to mask. Therefore, masking by undercutting the device to be coated is an important problem.

The irradiation of a finished object triggers a chemical reaction through absorption of the radiation. The penetration of the radiation into lower layers is diminished by absorbed in upper layers. Further, the decomposition products produced by these chemical reactions also absorb UV radiation so that even less radiation is available for hardening deeper layers. It is therefore practically impossible to homogeneously activate thick structures with radiation since, in practice, no resin matrix is perfectly transparent to UV radiation.

European Patent Application No. 0,094,915 discloses the preparation of storable activated preliminary stages from UV-reactive resins by irradiation followed by heat hardening. The preliminary stage is generated directly on a substrate. However, this method suffers the same disadvantages as thicker layer structures due to shading.

SUMMARY OF THE INVENTION

It is an object of the present invention to provide a method and apparatus to use radiation-hardenable reaction resin compounds to cover any components, including components that have undercuts and shadings. The present invention achieves homogeneous hardening of the reaction resin compound even for thick layer structures. The present invention also permits encapsulating UV-sensitive substrates, such as frequently found in microelectronics, with UV hardenable compounds.

The method the present invention can generate layer thicknesses on the order of several millimeters. Such structures were hardly possible when irradiating an already coated component, particularly to obtain homogeneous hardening. The differences in the degree of hardening caused by different layers having different distances from the light source are also eliminated for complicated components with raises.

The method according to the invention permits impregnating or casting different kind of seals. The casting can be performed in reusable or expendable molds. Cup-casting components can be placed in the cup with the irradiated resin or they can be placed in a cup filled with a sufficient quantity of irradiated resin. In both cases the resin rapidly hardens without further irradiation. This result has been obtained before only with purely thermally hardened resin.

The method of the present invention is particularly advantageous for applying adhesives. The resin need no longer be permeable to UV when cementing with UV-reactive compounds of the joints to be cemented as previously required. Rather, the joining occurs after applying the irradiated resin. Subsequently, the irradiated resin gels in a dark reaction. The resin may additionally be converted into the final hardened condition using thermal hardening.

UV-sensitive components, such as opto-electronic sensors, can be quickly covered using the method of the present invention because only the resin, and not the substrate and resin, is exposed to the UV radiation.

It is further advantageous to use the same applicator for different applications. In contrast, irradiating the resin after application requires different irradiation fixtures for different applications.

The UV irradiated reaction resin compounds can subsequently comprise additives which interfere with the UV excitation or are altered by it. These additives include pigments and dies.

A UV-hardenable reaction resin compounds includes those compounds in which a dark reaction follows a UV exposure and continues without further UV-irradiation. Slight heating may be used to encourage this continued reaction.

BRIEF DESCRIPTION OF THE DRAWINGS

FIG. 1 shows an apparatus for irradiating reaction resin according to the present invention;

FIG. 2 shows an alternate embodiment of the present invention that is particularly well adapted for cementing miniture components;

DETAILED DESCRIPTION

Figure 3:
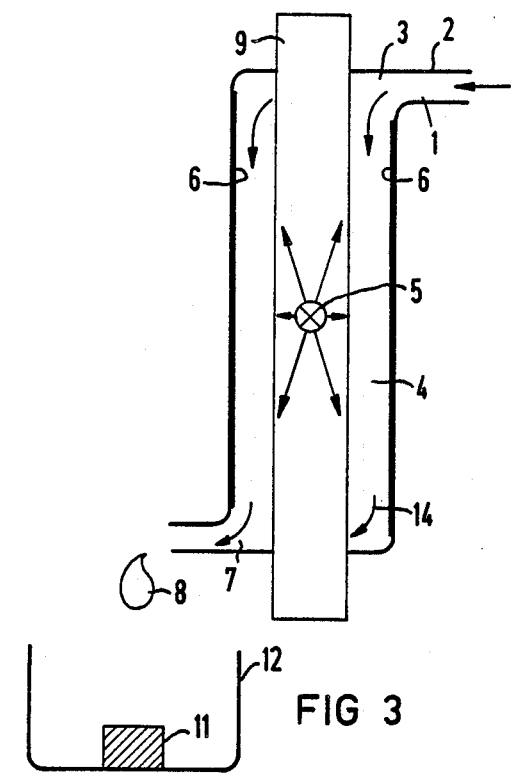
FIG. 3 is a cross-section through an irradiation space of an embodiment of the present invention.

A suitable reaction resin compounds preferably hardens through a known cationic reaction mechanism. These compounds include compounds having a basis of vinyl compounds such as vinyl ethers, cinyl esters and vinyl aromatics, as well as herterocyclic compounds such as oxiranes, thiiranes, acetidines, oxetanes, oxolanes, lactones and various spirocompounds. Methylol compounds such as aminoplasts and phenoplasts are also suitable.

Suitable photoinitiators are onium salts such as triarylsulfonium salts as are described, for example, in U.S. Pat. Nos. 4,058,400 and 4,058,401, and diaryliodonium salts disclosed in U.S. Pat. No. 4,378,277. A representatives of other suitable onium salt initiators include carbamoylsulfoxonium salts such as disclosed in European Patent No. 0,044,274 B1. Anions of the onium salts predominantly serve as nonnucleophilic anions of strong acids such as $HBF_4$, $HPF_6$, $HAsF_6$, $HSbF_6$, as well as the anions of heteropoly acids as disclosed in European Patent No. 0,136,379 A3.

Photoinitiators that are preferred for use in the present invention are resin mixtures as disclosed in European Patent No. 0,994,915 A3. These are cationically hardenable reaction resins or resin mixtures contain photo-sensitive π-aren complexes. A complex having the formula

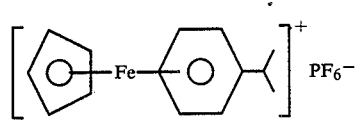

can be obtained under the designation Experimental Photoinitiator CG 24-61 (Ciba Geigy GmbH). Further preferred photoinitiator systems form part of the resin mixtures disclosed in European Patent No. 0,091,131 A2 and comprise aluminum compounds and silanolate precursor stages.

The UV hardenable reaction resins used for the method according to the invention also may be only partially UV-reactive Functionalities may effectively be contained in the resin which are activated via a path different from UV-irradiation such as thermally, through moisture or anaerobically. The functionalities can be incorporated completely, partially or not at all in the same molecule of the UV reactive component. This combination of functionalities can lead to subsequent cross-linking, grafted polymerization or interpenetrating networks.

It has been found that coatings prepared by the method according to the invention, particularly coated substrates, exhibit good dimensional stability even with considerable thicknesses. Hardening also occurs in shaded regions. Thus, the method according to the present invention is particularly economical and particularly well suited for the protection of hybrid circuits.

The invention is explained in greater detail using the following illustrative examples.

EXAMPLE 1

| | | |
|---|---|---|
| 100 MT | MY 790$_R$ | Low-molecular distilled bisphenol-A resin |
| 100 MT | CY 179$_R$ | Cycloaliphatic diepoxide |
| 4 MT | CG 24-61 | Experimental photo initiator |
| 0.5 MT | | Anthracene (as sensitizer) |

The non-irradiated compound has at room temperature a storage life of more than one half a year and a gelling time of more than 100 minutes at 100° C.

After an irradiation of 10 seconds in a Xenon flashing device RC 5000 in a one-way injection of PP-PE, the compound is removed. It gels at room temperature in 20 seconds and 100° C., in less than 10 seconds.

EXAMPLE 2

| | | |
|---|---|---|
| 100 MT | CY 179$_R$ | Cycloaliphatic diepoxide |
| 2.5 MT | CG 24-61 | Experimental photo initiator |
| 2.5 MT | Cumolhydroperoxide | |
| 0.25 MT | Anthracene | |

Storage life and gelling time are the same as disclosed in the untreated condition in EXAMPLE 1.

After an irradiation of 5 seconds, the compound gels at room temperature in 20 seconds.

A suitable applicator of the present invention comprises a reactor that is at least partially permeable to radiation and has a space in which ultra-violet radiation from a source can irradiate resin. Optionally a reflector is positioned between the feed line for the unactivated resin and the exit opening for the activated resin. The reflector may be positioned on one side of the reactor or on both sides of the reactor so as to surround it. The reactor may comprise a tube that has a concave flow profile.

Applicators for reaction resins typically consist of a storage tank for the reactive compound, a dosing valve and a pouring nozzle. The storage tank may optionally be equipped with a stirrer or the storage take may be acted on by pressure.

Due to their reactivity, conventional reaction resin compounds exhibit increased viscosity and thus have both a limited use life and long hardening times. Reaction resin compounds with a short hardening time and, therefore, a short use time commonly require a large apparatus for preparation and processing.

According to the method of the invention, reaction resin compounds are used in a simple applicator which has, in the not activated condition, nearly unlimited use time. The reaction resin is activated using UV-light immediately before application. This activation occurs in a reactor 17 that comprises an irradiation space 4, a UV-radiation sources and, optionally, a reflector 6. The initial, not activated, compound 1 is fed-in on a preferred side of the irradiation space 4 and the activated compound is discharged on a side which is removed as far as possible from the feed. The initial and activated compounds cannot mix with each other. The initial reaction resin compound 1 is continuously irradiated in the irradiation space 4 during the flow-through or discontinuously during standstill and is thereby activated.

The method of the present invention may be practiced using the apparatus shown in FIG. 1. The apparatus processes initial reaction resin compound 1 that is highly permeable to UV-light. An irradiation space 4 is formed by a transparent body that has light on all sides and serves as a window 16. The irradiated space may have a round or rectangular cross section in the direction of flow. A plane or tray-shaped reflector 6 is arranged opposite the UV-radiation source 5 behind the irradiation space 4 to improve the light yield.

FIG. 2 shows the UV-light as being conducted from the radiation source 5 to the irradiation space 4 via a light-conducting medium 9 such as fused silica, acryl glass or a light-conducting liquid. The light arrives through window 16 immediately in front of exit opening 7 in the irradiation space 4 and activates the initial reaction resin compound 1. The dimensions of this applicator can be made particularly small. The applicator is therefore especially well suited for cementing miniature components or for sprinkling an object 10.

FIG. 3 shows a cross section through the irradiation space of a reactor. This embodiment shows the irradiation space 4 surrounding tubular UV-radiation source 5 preferably filled with a light-guiding medium 9. The irradiation space 4 carries a reflector on the inside of its envelope. The UV-radiation source 5 also can be mounted outside the region of the irradiation space 4 so that the UV-light is coupled via a light-guiding medium 9 into the irradiation space 4. After passing the irradiation space 4, the active compound is, for example, applied in an open casting mold 12 to encapsulate an object 11.

Figure 4:
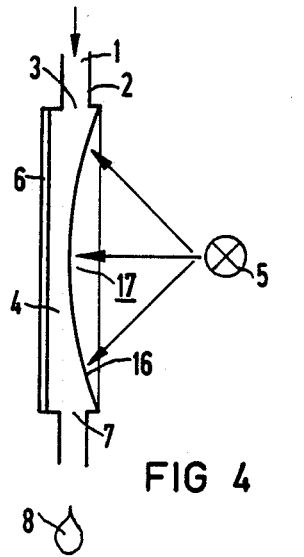
FIG. 4 shows an alternate embodiment of the present invention that facilitates flow through the irradiation space.

FIG. 4 shows a cross section of a design of the irradiation space 4 that is particularly advantageous for facilitating flow. Window 16 of irradiation space 4 is spherically curved inwardly. Uniform irradiation of the initial reaction resin compound 1 can be achieved in this embodiment because the resulting flow velocity increases toward the outside and thus compensates for longer flow paths.

Figure 5:
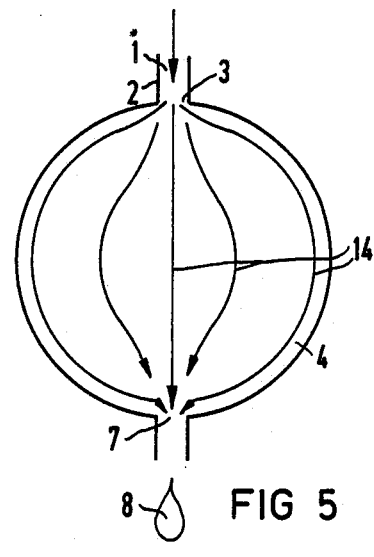
FIG. 5 shows a cross-section of an alternate irradiation space for an embodiment of the present invention.

FIG. 5 shows the flow path of the reaction resin compound in the irradiation space 4 with flow lines 14. This arrangement is particularly well suited for processing filled reaction resin compounds.

Figure 6:
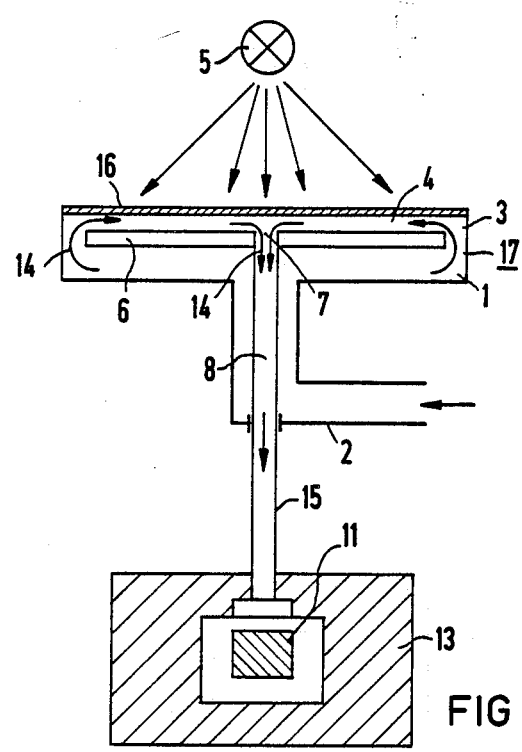
FIGS. 6 and 7 show an alternate embodiment of the present invention that is particularly well adapted for processing different compounds in a common reactor.

FIG. 6 shows that the depth of the irradiation space 4 can change so that the layer thickness of the irradiated reaction resin can be set accordingly. The depth is adjusted by moving casting can 15 in an axial direction. Canal 15 is connected to the reflector 6 to form a tube. This arrangement is particularly advantageous for processing different compounds in the same reactor with or without a filler that is activated with UV-light. The layer thicknesses of the reaction resin compounds can be optimally adapted for UV-absorption and viscosity.

Figure 7:
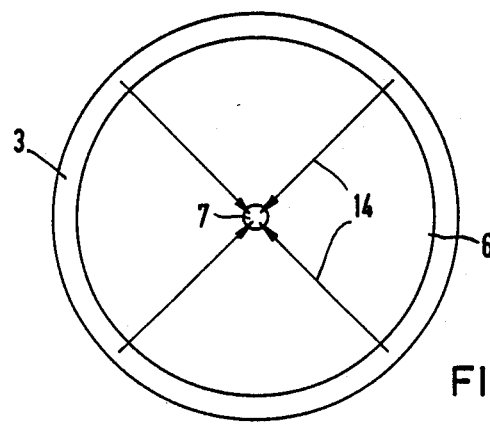

A further advantage of this embodiment is the arrangement of the reflector 6 centered on the ring-shaped input opening 3 and central exit opening 7 as is shown in the top view of FIG. 7. The flow paths of the resin compound to be activated are then absolutely equal and the same radiation dose is thereby achieved. An object 11 to be enclosed is cast-over with the activated reaction resin compound 8 via the directly connected casting canal 15 in a closed casting mold 13.

It is sometimes advantageous to mix the activated resin compound 8 with further additives after the irradiation process. These additives obviously should not need to participate in the activation process. The additives may include flexibility agents, parting agents, adhesion promoters, anti-aging agents and the like, or ingredients of the matrix components. This particularly applies to resin components that interfere with the irradiation process such as UV impermeable fillers such as metal powders, titanium dioxide, carbon black and certain pigments. The additives are immediately fed in behind exit opening 7. Homogenization subsequently occurs in a dynamic or static continuous flow mixer of known design.

It is advantageous to make the entire applicator of material that is impermeable to light such as stainless steel, dyed plastic or the like. The only exception is window 16 for the light input into the irradiation space 4 and, optionally, of a window for reflector 6. The light compartment thus prevents the reaction resin compound from being activated before reaching irradiation space 4.

Window 16 comprises light-permeable material such as fused silica, acryl glass, etc., in the form of plates, tubes or foils.

The irradiation source may be any common UV source such as rare gas, metal or metal-halogenide radiators, carbon arcs or lasers of various kinds. It is a prerequisite that the photo initiator comprise light of suitable wavelength and sufficient energy density. The choice of light source and irradiation geometry is thus a design consideration within the level of one skilled in the art.

What is claimed is:

1. An application for processing UV-hardenable-resin, comprising:
    a source of UV radiation;
    a reactor that is at least partially permeable to the UV radiation from the source;
    a reactor that encloses an irradiation space;
    means for directing the UV radiation into the irradiation space;
    a feed line for supplying initial, not activated reaction resin to the reactor;
    an exit opening in the reactor for removing activated reaction resin; and
    a reflector on at least one side of the reactor to reflect the UV radiation from the source back into the irradiation space.

2. An apparatus as claimed in claim 1, wherein the reflector is positioned on opposing sides of the reactor.

3. An apparatus as claimed in claim 1, wherein the reflector surrounds the reactor.

4. An apparatus as claimed in claim 1, wherein the reactor is designed as a tube.

5. An apparatus as claimed in claim 1, wherein the reactor has a concave flow profile.

6. An apparatus according to claim 1 further comprising dosing means for measuring and transferring a measured amount of activated reaction resin through lsaid exit opening.

* * * * *